United States Patent [19]

Parker, Jr. et al.

[11] Patent Number: 5,436,968
[45] Date of Patent: Jul. 25, 1995

[54] DIGITAL DATA-DEPENDENT AC IMPEDANCE TERMINATION OF TELEPHONE LINE

[75] Inventors: Geoffrey H. Parker, Jr., Ventura; Michael D. Horton, Port Hueneme, both of Calif.

[73] Assignee: Harris Corporation, Melbourne, Fla.

[21] Appl. No.: 85,442

[22] Filed: Jun. 30, 1993

[51] Int. Cl.$^6$ ............................................ H04M 1/00
[52] U.S. Cl. ..................... 379/398; 379/394; 379/30; 379/400
[58] Field of Search ................ 379/398, 394, 30, 400, 379/401, 377, 24, 27, 29, 399

[56] References Cited

U.S. PATENT DOCUMENTS

| | | | |
|---|---|---|---|
| 4,581,494 | 4/1986 | Pickens | 379/27 X |
| 4,759,059 | 7/1988 | Christensen | 379/399 X |
| 5,038,372 | 8/1991 | Elms et al. | 379/377 X |
| 5,063,593 | 11/1991 | Kwon | 379/377 X |
| 5,109,409 | 4/1992 | Bomgardner et al. | 379/377 |
| 5,255,317 | 10/1993 | Arai et al. | 379/399 |
| 5,305,377 | 4/1994 | D'Arcy et al. | 379/399 |

*Primary Examiner*—James L. Dwyer
*Assistant Examiner*—M. Shehata
*Attorney, Agent, or Firm*—Charles E. Wands

[57] ABSTRACT

The potential impedance mismatch of digital terminal equipment and a line test unit that has been equipped to conform with the Bellcore standard of terminating the line with a 600–900 ohm impedance during data reception is addressed by modifying the craftsman's test unit to include a controllably disabled AC impedance, which is operative to normally bridge the tip and ring leads of the telephone circuit under test with the required (600–900 ohm) impedance during data reception and, under direct control by the craftsman's keypad or software control resident in the test set's microcontroller, to selectively remove the AC matching impedance that would otherwise bridge the line. The AC impedance is comprised of a D.C. blocking capacitor and a resistor coupled in series with a controllable solid state relay which is normally rendered conductive during data reception to bridge the tip and ring leads. By direct manual control from the craftsman's keypad, or software control resident in the test set's microcontroller, the normally enabling control signal supplied by the microcontroller to the solid state relay may be removed, so as to selectively decouple the AC matching impedance that would otherwise bridge tip and ring leads of the telephone line during data reception, so as to make the test unit compatible with customer equipment, whether or not that equipment contains an AC impedance termination that satisfies the Bellcore requirement.

11 Claims, 3 Drawing Sheets

DIGITAL DATA-DEPENDENT AC IMPEDANCE TERMINATION OF TELEPHONE LINE

FIELD OF THE INVENTION

The present invention relates in general to telecommunication circuits and is particularly directed to a mechanism for controllably terminating the tip and ring leads of a telephone line with a matching A.C. impedance, particularly in dependence upon whether or not the telephone line is carrying digital data signals.

BACKGROUND OF THE INVENTION

Because of problems experienced by certain lines and switching equipment during digital data transmission over voiceband telephone lines, Bellcore standards now require that a matching AC impedance (on the order of 600–900 ohms) be placed across the tip and ring leads of the line to which customer provided equipment is connected for data reception. As much of the equipment currently in use does not satisfy this requirement, testing of a line to which such equipment is connected by a craftsman's test unit that is provided with such a matching impedance termination may present to the line a load impedance that is different from that presented by a customer's digital communication device, thereby impairing the ability of the craftsman to diagnose the source of a fault on the line.

SUMMARY OF INVENTION

In accordance with the present invention, the above-described impedance mismatch problem is successfully addressed by equipping the craftsman's test unit with a controllably insertable AC impedance which is operative to normally bridge the tip and ring leads of the telephone circuit under test with the required (600–900 ohm) impedance during data reception and, under direct control by the craftsman's keypad or software control resident in the test set's microcontroller, to selectively remove the AC matching impedance bridging the line.

In particular, the present invention is directed to a circuit for controllably terminating the tip and ring leads with an A.C. impedance, comprised of a D.C. blocking capacitor and a resistor that are coupled in series with a controllable switching device (solid state relay) across the tip and ring leads. The solid state relay is selectively operated by the test set's microcontroller to normally bridge the tip and ring leads with the A.C. impedance circuit in dependence upon the type of communication signals conveyed over said communication lines, i.e. during reception of digital data signals. Specifically, the default state of the solid state relay is such that, during data reception, it is normally rendered conductive by an enabling logic signal from the test set's microcontroller, so that the tip and ring leads will be bridged by the A.C. impedance.

By direct manual control from the craftsman's keypad, or software control resident in the test set's microcontroller, the normally enabling control signal input to the solid state relay may be removed, so as to selectively decouple the AC matching impedance that would otherwise bridge tip and ring leads of the telephone line during data reception.

DETAILED DESCRIPTION

Figure 1:
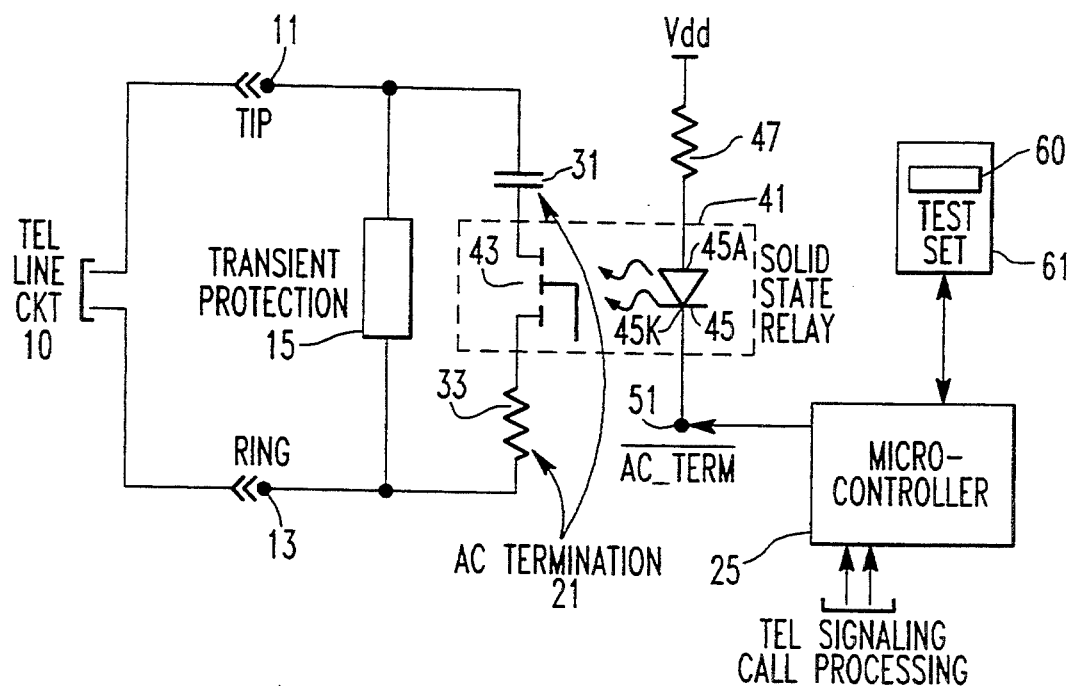
FIG. 1 is a schematic illustration of a controllably enabled A.C. impedance termination circuit for bridging the tip and ring leads of a telephone line circuit in accordance with an embodiment of the present invention.

FIG. 1 shows schematic illustration of a controllably enabled A.C. impedance termination circuit resident in a service technician's test set, in accordance with an embodiment of the invention, for bridging the tip and ring leads of a telephone line circuit in dependence upon whether the telephone line circuit is carrying digital data traffic. As shown in the Figure, the test set's controlled termination circuit of the present invention includes respective tip and ring terminals 11 and 13 which are to be coupled the corresponding leads of a telephone line circuit 10. Bridging the tip and ring lead terminals of the test set is a conventional voltage transient protection circuit 15.

Also coupled to tip and ring terminals 11 and 13 is a controllably enabled A.C. impedance circuit 21, which is normally operative during data reception (under software control resident in the test set's microcontroller 25) to bridge the tip and ring leads of the telephone line under test with an A.C. matching impedance, shown in FIG. 1 as comprising a D.C. blocking capacitor 31 and a resistor 33 that are coupled in series with a controllable switching device (e.g. a solid state relay) 41.

In accordance with a non-limitative illustrated embodiment of the present invention, solid state relay 41 may comprise a light responsive field effect transistor 43 having its source and drain terminals coupled in circuit with capacitor 31 and resistor 33 and having an opto-electronically responsive gate that is optically coupled with a light emitting diode (LED) element 45. The anode 45A of LED 45 is coupled through a resistor 47 to a bias voltage terminal Vdd, while its cathode 45 K is coupled to a control signal terminal 51, to which a control signal (ACTERMBAR) from the test set's microcontroller is applied.

Normally, when a digital data signal is transmitted over the telephone line under test, the modem unit in the test set answers the call and outputs to the microcontroller a signal indicative of the presence of digital data signal. Microcontroller 25 responds to this 'data present' signal by asserting the ACTERMBAR signal to a LOW condition, so that LED 45 is turned on, thereby rendering FET 43 conductive and causing tip and ring leads of the telephone line circuit to be bridged with the A.C. impedance.

Figure 2:
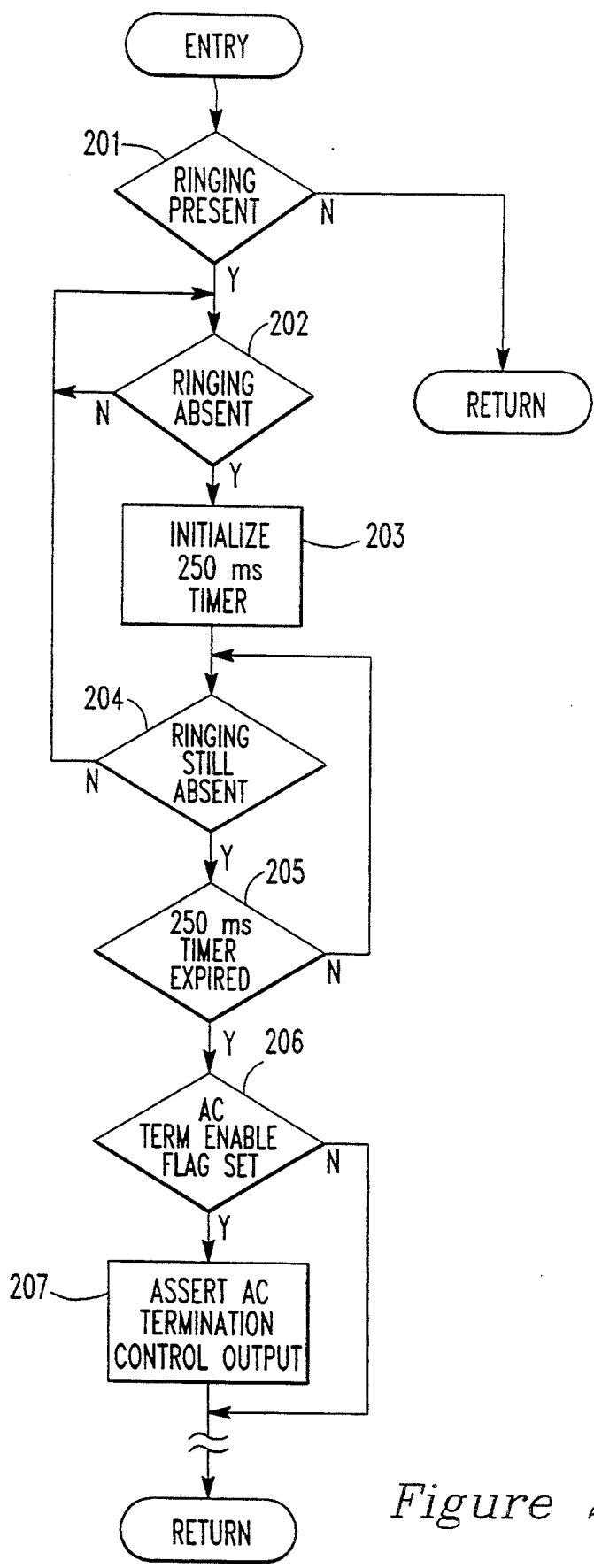
FIGS. 2 and 3 are flow charts of a routine resident in a test set's microcontroller, that allows the technician to alternately disable or enable automatic application of the A.C. impedance termination network of FIG. 1 across tip and ring input terminals.

The control routine in the software resident within microcontroller 25 for controlling its asserting of the ACTERM BAR signal is diagrammatically illustrated in the flow chart of FIG. 2. As shown therein, after the termination of ringing (STEPS 201–204), a determination is made as to whether a (250 ms) timer has expired (STEP 205). Upon expiration of the time-out, the ACTERM BAR signal is asserted, if the AC termination flag has been set (STEP 206). If the AC termination flag (set in the routine flow of FIG. 3, to be described) has not been set, the AC TERM BAR signal line is not asserted low and the termination impedance 21 does not bridge the line.

The default condition of automatically bridging the tip and ring leads with an A.C. impedance during data reception is selectively modifiable by either a direct, manually generated input signal to microcontroller 25, using the test set's keypad, or under software control, which contains an routine that queries the craftsman, e.g. via an indicator panel light or synthesized voice announcement as to whether the signal ACTERM BAR is to be disabled (i.e. held high). Such a query provides the craftsman with the ability to selectively change the default setting and instruct the microcontroller to assert the control input to the solid state relay high, thereby keeping the A.C. impedance from bridging the tip and ring terminals during digital data reception.

Figure 3:
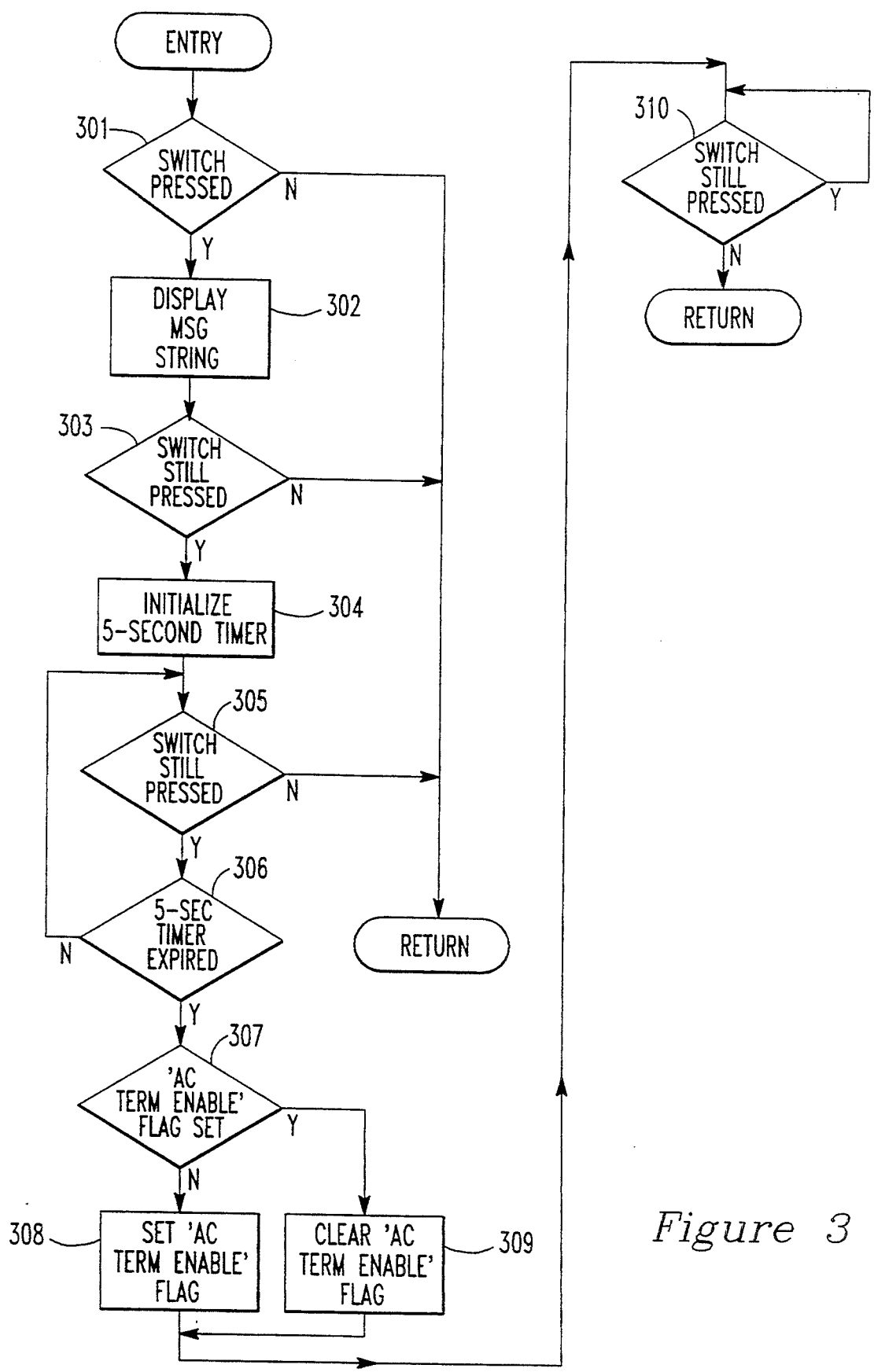

More particularly, the control software resident in microcontroller 25 also contains the routine diagrammatically illustrated in the flow chart of FIG. 3, that allows the technician to alternately disable or enable automatic application of the A.C. impedance termination network 21 across test set tip and ring input terminals 11 and 13, respectively. This selective control of the automatic application of A.C. impedance termination network 21 may be effected by way of an external interface I/O element, such as a pushbutton panel "Feature Select" switch 60 on the craftsperson's test set keypad 61.

As shown in the flow chart of FIG. 3, the technician enables or disables bridging of termination network 21 by pressing and holding "Feature Select" switch 60 for a predetermined period of time, for example, for approximately five seconds (STEPS 301–306). Upon expiration of this hold-down interval (the output of query STEP 306 is YES), the resident control mechanism controls the status of the AC termination enable flag (STEPS 307–309) and causes a message to be displayed on the test unit's liquid crystal display, advising the technician of the new feature status. The feature setting may be changed at any time, but preferably not during when ringing potential is present on the unit's tip and ring inputs.

The routine 'toggles' the status each time the pushbutton switch is pressed and held for the prescribed interval. (The hold down interval terminates at STEP 310, when the switch is released.) If the feature was enabled prior to the user's action, the feature will be disabled. Conversely, the feature will be enabled if it was disabled prior to the user's action. The feature status is retained under control of the software routine in the internal memory of microprocessor 25. Preferably, the last setting remains in effect until changed by the user (or the unit's battery is removed, resulting results in a loss of internal memory contents).

As will be appreciated from the foregoing description, the previously described potential impedance mismatch of digital terminal equipment and a line test unit that is equipped to conform with the current Bellcore standard is successfully addressed by modifying the craftsman's test unit to include a controllably disabled A.C. impedance, which is operative to normally bridge the tip and ring leads of the telephone circuit under test with the required (600–900 ohm) impedance during data reception and, under direct control by the craftsman's keypad or software control resident in the test set's microcontroller, can selectively remove the AC matching impedance that would otherwise bridge the line.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with a communication signal transmission network, having a pair of communication lines, over which communication signals are conveyable, a method of controllably terminating said pair of communication lines, comprising the steps of:
   (a) providing an AC impedance circuit capable of being coupled across said pair of communication lines, said AC impedance circuit including a DC blocking element which is operative to block the flow of DC current therethrough;
   (b) monitoring said pair of communication lines for the presence of digital data signals being transmitted over said pair of communication lines; and
   (c) in response to step (b) detecting the presence of digital data signals being transmitted over said pair of communication lines, controllably causing said AC impedance circuit to bridge said pair of communication lines, said DC blocking element preventing DC current from being drawn from said pair of communication lines during the transmission of digital data signals thereover.

2. A method according to claim 1, further including the step of (d) selectively preventing step (c) from controllably causing said AC impedance circuit to bridge said pair of communication lines when step (b) detects the presence of digital data signals being transmitted over said pair of communication lines.

3. A method according to claim 2, wherein said pair of communication lines comprise respective tip and ring leads of a telephone line circuit.

4. A method according to claim 3, wherein said A.C. impedance comprises a load resistor and a D.C. blocking capacitor coupled series with a controllable switching device across the tip and ring leads of said telephone line circuit, and wherein step (c) comprises, in response to step (b) detecting the presence of digital data signals being transmitted over said pair of communication lines, turning on said controllable switching device so as to electrically bridge said pair of communication lines with said AC impedance circuit.

5. For use with a craftsperson's telephone line test circuit, which is connectable to a communication signal transmission network having a pair of communication lines over which digital data signals are conveyable, a circuit for controllably terminating said pair of communication lines comprising an AC impedance circuit including a controllable switching element and a DC blocking element coupled in series across said pair of communication lines, said DC blocking element being operative to block the flow of DC current therethrough, and a digital data signal detection circuit which monitors said pair of communication lines for the presence of digital data signals being transmitted thereover and, in response to detecting digital data signals being transmitted over said pair of communication lines, controllably turns on said controllable switching element and thereby causes said AC impedance circuit to bridge said pair of communication lines.

6. A circuit according to claim 5, wherein said digital data signal detection circuit includes a control circuit which is selectively controllable to prevent said controllable switching element from being turned on when said digital data signal detection circuit detects the presence of digital data signals being transmitted over said pair of communication lines.

7. A circuit according to claim 6, wherein said pair of communication lines comprise respective tip and ring leads of a telephone line circuit.

8. A circuit according to claim 7, wherein said A.C. impedance further comprises a load resistor coupled in series with a D.C. blocking capacitor and said controllable switching device across the tip and ring leads of said telephone line circuit.

9. For use with a communication signal transmission network, having a pair of communication lines, over which communication signals are conveyable, a method of terminating said communication lines, comprising the steps of:

(a) providing an AC impedance circuit having a DC blocking element that is normally automatically coupled across and is operative to prevent DC current from being drawn from said pair of communication lines during the transmission of digital data signals over said pair of communication lines; and (b) selectively preventing said impedance circuit from being electrically coupled across said pair of communication lines during the transmission of digital data signals over said pair of communication lines.

10. A method according to claim 9, wherein step (a) comprises coupling a controllable impedance circuit which includes a controllable switching device coupled in series with said A.C. impedance circuit across said pair of communication lines, and wherein step (b) comprises controlling the conductivity of said controllable switching device so as to selectively decouple said A.C. impedance circuit from said pair of communication lines during the presence of digital data signals on said pair of communication lines.

11. A method according to claim 10, wherein said pair of communication lines comprise respective tip and ring leads of a telephone line circuit, and wherein said A.C. impedance circuit comprises a load resistor and a D.C. blocking capacitor coupled in series with said controllable switching device.

* * * * *